US009860502B2

(12) United States Patent
Urban et al.

(10) Patent No.: US 9,860,502 B2
(45) Date of Patent: Jan. 2, 2018

(54) METHOD AND DEVICE FOR PROCESSING A VIDEO

(71) Applicant: THOMSON LICENSING, Issy les Moulineaux (FR)

(72) Inventors: Fabrice Urban, Thorigne Fouillard (FR); Christel Chamaret, Chantepie (FR); Yoann Baveye, Saint-Ave (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/897,630

(22) PCT Filed: Jun. 2, 2014

(86) PCT No.: PCT/EP2014/061351
§ 371 (c)(1),
(2) Date: Dec. 10, 2015

(87) PCT Pub. No.: WO2014/198575
PCT Pub. Date: Dec. 18, 2014

(65) Prior Publication Data
US 2016/0127705 A1 May 5, 2016

(30) Foreign Application Priority Data

Jun. 10, 2013 (EP) .................................... 13305774

(51) Int. Cl.
*H04N 9/64* (2006.01)
*G06T 11/00* (2006.01)
(Continued)

(52) U.S. Cl.
CPC .......... *H04N 9/643* (2013.01); *G06K 9/4609* (2013.01); *G06K 9/4642* (2013.01);
(Continued)

(58) Field of Classification Search
None
See application file for complete search history.

(56) References Cited

U.S. PATENT DOCUMENTS

| 2005/0207669 | A1 | 9/2005 | Kameyama |
| 2010/0002145 | A1 | 1/2010 | Spence et al. |
| 2015/0077639 | A1* | 3/2015 | Chamaret ............ H04N 1/6075 348/708 |

FOREIGN PATENT DOCUMENTS

CN 101695136 4/2010

OTHER PUBLICATIONS

Gruber, L.—"Color Harmonization for Augmented Reality"—2010 IEEE, pp. 227-228.*

(Continued)

*Primary Examiner* — Bernard Krasnic
(74) *Attorney, Agent, or Firm* — Myers Wolin, LLC

(57) ABSTRACT

A method for processing a video is disclosed. The method comprises:
obtaining a type and an angle of a template for each picture of the video independently, each template defining a portion of harmonious color values;
temporally filtering the types and angles over the video;
processing each picture of the video, wherein processing the picture comprises mapping the colors of the picture into the template associated with the picture and defined by the filtered type and the filtered angle.

15 Claims, 7 Drawing Sheets

(51) Int. Cl.
G06K 9/46 (2006.01)
G06T 5/40 (2006.01)
H04N 9/73 (2006.01)
G06T 7/90 (2017.01)

(52) U.S. Cl.
CPC ............ G06K 9/4652 (2013.01); G06T 5/40 (2013.01); G06T 7/90 (2017.01); G06T 11/001 (2013.01); H04N 9/646 (2013.01); H04N 9/73 (2013.01); G06T 2207/10016 (2013.01); G06T 2207/10024 (2013.01); G06T 2207/20032 (2013.01)

(56) References Cited

OTHER PUBLICATIONS

Cohen-Or etal: "Color Harmonization", ACM SIGGRAPH 2006 courses on, SIGGRAPH '06, Jan. 1, 2006, pp. 624-630.
Huo etal: "An improved method for color harmonization", Image and Signal Processing, 2009. CISP '09. 2nd International congress on, IEEE, Oct. 17, 2009, pp. 1-4.
Sawant etal: "Color harmonization for videos", Computer Vision, Graphics&Image Processing, 2008. ICVGIP '08. Sixth Indian Conference on, IEEE, Dec. 16, 2008, pp. 576-582.
Zhang etal.: "Online Video Stream Abstraction and Stylization";—IEEE Transactions on Multimedia vol. 13, No. 6, Dec. 2011; pp. 1-18.
Tang etal. : "Colour harmonisation for images and videos via two-level graph cut;" IET Image Processing, vol. 5, Issue No. 7, pp. 630-643; the Institution of Engineering and Technology, Oct. 2011.
Delon etal : "A nonparametric approach for histogram segmentation"; IEEE Transactions on Image Processing, (vol. 16, Issue 1, pp. 253-261)—Jan. 2007.
Tokumaru etal : "Color design support system considering color harmony"; FUZZ-IEEE'02. Proceedings of the 2002; IEEE International Conference on Fuzzy Systems, 2002—pp. 378-383—May 12-May 17, 2002.
Van De Weijer etal: "Learning color names for real-world applications"—Image Processing, IEEE Transactions on (vol. 18, Issue 7)—pp. 1512-1523—Jul. 2009.
Tang etal : "Color harmonization for images"—Journal of Electronic Imaging, vol. 20, Issue No. 2, SPIE—The International Society for Optical Engineering, Apr.-Jun. 2011; pp. 1-13.
Search Report Dated Aug. 29, 2014.

* cited by examiner

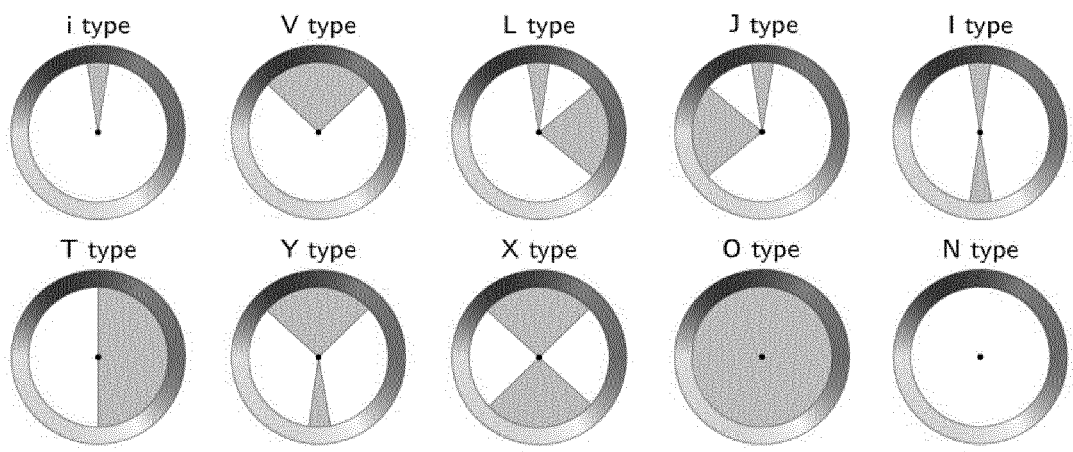
FIGURE 1 – Prior Art
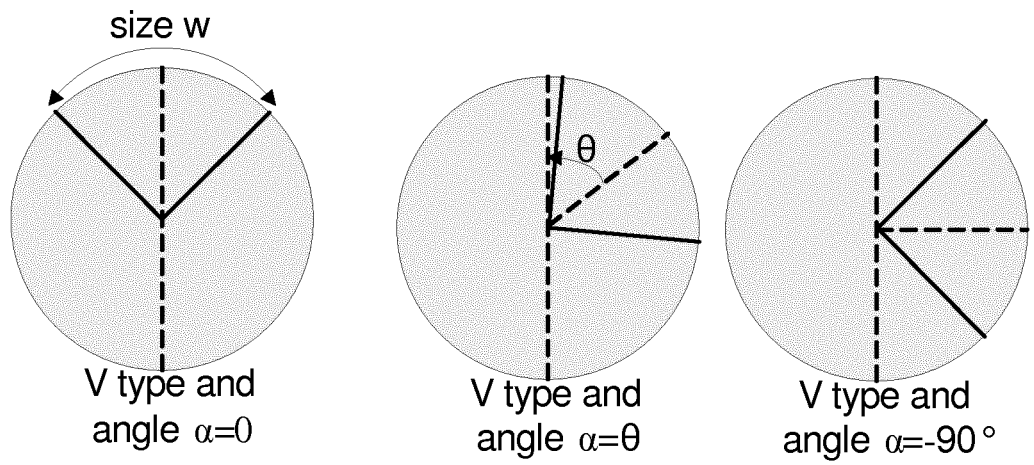
FIGURE 2

METHOD AND DEVICE FOR PROCESSING A VIDEO

This application claims the benefit, under 35 U.S.C. §365 of International Application PCT/EP2014/061351, filed Jun. 2, 2014, which was published in accordance with PCT Article 21(2) on Dec. 18, 2014 in English and which claims the benefit of European patent application No. 13305774.5, filed Jun. 10, 2013.

1. FIELD OF THE INVENTION

The invention relates to a method and a device for processing a video. More precisely, the video processing method comprises mapping colors of the pictures of the video using a template of harmonious colors.

2. BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is known to correct colors in pictures or in some parts of the pictures to improve the perceptual experience. As an example, pictures with saturated colors are advantageously processed to remove these saturated colors and thus improve the perceptual experience.

Document entitled "*Color Harmonization*" from Cohen-Or teaches a method for harmonizing pictures based on harmonious color templates. An harmonious color template $T_{m,\alpha}$ is defined by a template type m and an angle $\alpha$. These harmonious color templates are depicted on FIG. 1. This method has the several drawbacks. First, it is not fully automatic and requires manual annotation for "sensitive" areas (typically skin or sky that look unnatural if they lose their original color). Second, color mapping is very basic. It maps color palette of the original picture by applying a Gaussian filter constraint in a template.

In order to harmonize the colors of a video, each individual picture of the video can be processed independently for example by applying the method of Cohen-Or. However, processing each picture independently results in artifacts such as flickering. In order to overcome this drawback, Sawant et al in "*Color harmonization for Videos*" published in Indian Conference on Computer Vision, Graphics and Image processing in 2008 teaches to compute a hue histogram for a current picture taking into account the pixels values of a N subsequent pictures. The hue histogram for the group of pictures that comprises the current picture and the N subsequent pictures is the mean of the hue histograms computed for each individual picture. The template type m is set to "X" and the template orientation a is computed from the group's histogram. All the pictures belonging to that particular group are harmonized with this calculated a. Finally, to avoid changes at group boundaries, some overlapping between groups is considered to compute the hue histogram. When computing the template from several pictures according to this method, the content of a single image can greatly impact the result, such as in the case of a flash, or of a scene change. When the type of the template or when the value of a abruptly changes, a visible temporal change can appear in the resulting video.

3. BRIEF SUMMARY OF THE INVENTION

The invention is aimed at alleviating at least one of the drawbacks of the prior art. To this aim, a method for processing a video is disclosed.
The method comprises:
obtaining a type and an angle of a template for each picture of the video independently, each template defining a portion of harmonious color values;
temporally filtering the template types and angles over the video;
processing each picture of the video, wherein processing the picture comprises mapping the colors of the picture into a template associated with the picture and defined by the filtered type and the filtered angle.

Advantageously, temporally filtering the template type over the video comprises associating with a current picture in a first temporal window, the template type with the highest occurrence in the first temporal window.

Advantageously, temporally filtering the template angle over the video comprises applying a median filter over the angles in a second temporal window comprising the current picture and associating with the current picture the filtered angle.

According to an aspect of the invention, when the temporal distance between a template change and a scene cut is below a threshold value, modifying, after the temporal filtering, the template type and/or angle of at least one picture between the scene cut and the template change so that the template change is temporally aligned on the scene cut.

According to another aspect of the invention, when a template change between a first template and a second template is not temporally aligned on a scene cut, mapping the colors of a picture around the template change comprises applying a mapping function defined from both the first and the second templates.

According to a specific characteristic, a transition window being centered on the template change between the first template and the second template, mapping the colors of a picture in the transition window comprises applying a mapping function defined as a weighted sum of a first mapping function defined from the first template and of a second mapping function defined from the second template, the first and the second mapping functions being weighted depending on the time position of the picture within the transition window.

Advantageously, processing each picture of the video further comprises determining a direction of mapping for each pixel of a picture and mapping the colors of the pixel in the direction of mapping into the template associated with the picture.

Advantageously, processing each picture of the video further comprises segmenting the picture into regions of similar colors and wherein colors of pixels in the same segmented regions are mapped into one and a same direction of mapping.

According to a specific characteristic, determining a direction of mapping for each pixel of a picture comprises, for a current picture, determining a backward motion vector for each pixel in the current picture pointing to a pixel in a preceding picture and for each pixel in the preceding picture a forward motion vector pointing to a pixel in the current picture, determining for each pixel in the current picture a motion vector reliability value depending on a distance between the backward motion vector associated with the pixel and the forward motion vector associated to the pixel to which the backward motion vector points and propagating the directions of mapping from the preceding picture to the current picture for the pixel whose motion vector reliability value is above a threshold value.

A device for processing a video is also disclosed. The processing device comprises:
- means for obtaining a type and an angle of a template for each picture of the video independently, each template defining a portion of harmonious color values;
- means for temporally filtering the template types and angles over the video;
- means for processing each picture of the video, wherein processing the picture comprises mapping the colors of the picture into a template associated with the picture and defined by the filtered type and the filtered angle.

The invention also relates to a computer program product comprising program code instructions to execute of the steps of the method for processing a video when this program is executed on a computer.

A computer-readable storage medium storing program instructions computer-executable to perform the method for processing a video is also disclosed.

4. BRIEF DESCRIPTION OF THE DRAWINGS

Other features and advantages of the invention will appear with the following description of some of its embodiments, this description being made in connection with the drawings in which:

FIG. 1 represents color templates as defined in the prior art;

FIG. 2 depicts one particular template that is turned around the hue wheel;

5. DETAILED DESCRIPTION OF THE INVENTION

An harmonious color template is thus a set of HSV values (hue, saturation and value) that are considered as rendering/reflecting a global harmonious effect when present at the same time. Eight harmonious color templates $T_m$ (m∈{i,I,L,T,V,X,Y,J}) are defined as depicted on FIG. 1. Each harmonious color template $T_m$ is made of different sectors. Harmonious colors are close if they are in the same sector, or complementary if they are in opposite sectors. Templates J and L handle orthogonal harmonious hues. A harmonious color template of type m may be turned around the hue wheel by an angle α. Thus an harmonious color template $T_{m,\alpha}$ is defined by a template type m and an angle α. On FIG. 2, a template of type V is represented. It comprises a single sector of size w. This template is turned around the hue wheel by an angle α.

Figure 3:
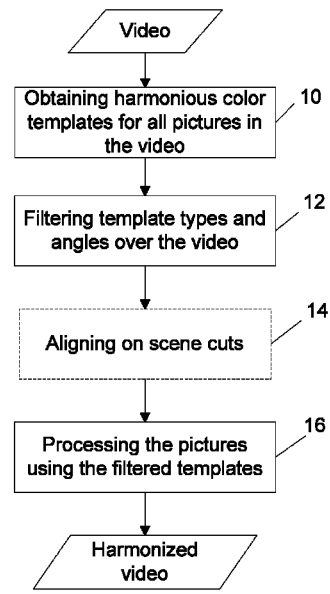
FIG. 3 depicts a flowchart of the video processing method according a particular embodiment.

FIG. 3 depicts a flowchart of the processing method according to a particular and non-limiting embodiment. On this figure optional steps are represented with dashed lines.

In a step 10, an harmonious color template $T_{m,\alpha}$ is obtained for each picture of the video independently. According to a specific embodiment, obtaining the harmonious color template $T_{m,\alpha}$ comprises determining an harmonious color template $T_{m,\alpha}$ for each picture of the video. To this aim, the color histogram M of a current picture is computed in HSV space such as defined below:

$$M(i) = \frac{1}{\sum_{(x,y)} S[x,y] * V[x,y]} * \sum_{(x,y) \in \{(u,v) \backslash H[u,v]=i\}} S[x,y] * V[x,y]$$

It is the normalized hue distribution weighted by saturation and value. Then, the appropriate template $\hat{T}_{m,\alpha}$ (i.e. type and angle) that best fits the hue distribution M is selected by minimizing the Kullback-Leibler divergence computed for each template and each orientation:

$$\hat{T}_{m,\alpha} = \underset{m,\alpha}{\operatorname{argmin}} \sum_i M(i) * \ln\left(\frac{M(i)}{P_{m,\alpha}(i)}\right)$$

where $P_{m,\alpha}$ is the distribution of template $T_{m,\alpha}$. $P_{m,\alpha}(i)$ represents the bin i of the distribution. Here $P_{m,\alpha}$ typically represents a harmonized model, description, or approximation of M. The distribution $P_{m,\alpha}$ can be uniform in each sector of the template and null elsewhere or can be a bump function. The invention is not limited by the way the distribution is defined. According to a variant, a template $\hat{T}_{m',\alpha'}$ is selected such that it matches the hue distribution M, i.e. such that the Kullback-Leibler divergence $$d = \sum_i M(i) * \ln\left(\frac{M(i)}{P_{m',\alpha'}(i)}\right)$$

is below a threshold value, where m'∈{i,I,L,T,V,X,Y,J,O}. In this case, the template is not necessarily the one that best fits the hue distribution M, but it is close to the hue distribution M.

Figure 4:
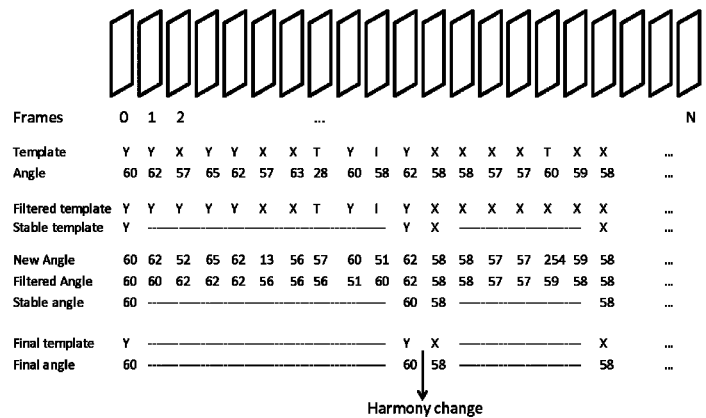
FIG. 4 represents a video and the outputs of the steps of the processing method according to the invention.

Singular picture such as pictures containing flash or explosion does not influence the determination of the type and angle in neighboring pictures since step 10 is applied independently on each picture of the video. However, without any further processing flickering appears on the video processed with the harmonious color templates determined at step 10. The output of this step is illustrated by FIG. 4.

According to a variant, the template type and angle are obtained at step 10 from a memory, optionally of a remote equipment of a communication network.

Figure 5:
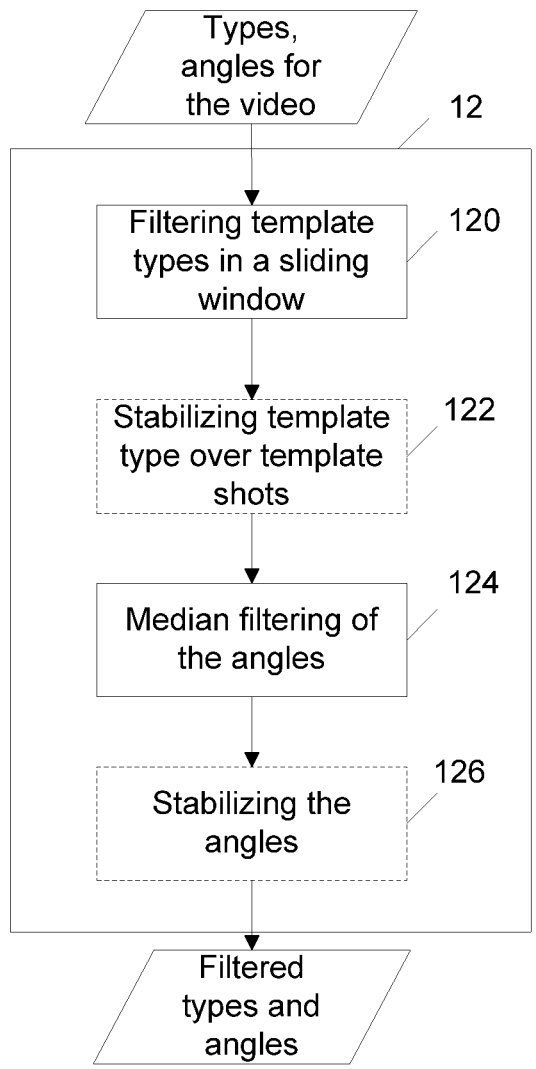
FIG. 5 depicts a detailed implementation of template's type and angle temporal filtering step.

In a step 12, the template type m and template angle α are temporally filtered over the video. This step is detailed with respect to FIG. 5.

In a sub-step 120, the template type is filtered in order to remove outliers and replace them with a template type of a neighboring picture. To this aim, a temporal window of p pictures is used that comprises a current picture whose template type is to be filtered. The temporal window is for example centered on the current window. The size p of the temporal window used on FIG. 4 is 3. A size of at least 5 pictures is preferred because flashes duration is usually 2 or more pictures. Typically, the length of the temporal window is 1 second of the video. The filtered template type for the current picture is set to the most occurring template type in the window. As an example for a temporal window of 5 pictures with template types YYXYT, the template type of the current picture is changed from type X to type Y since Y is the most occurring template type. According to a specific characteristic, the temporal window is a sliding window.

In an optional sub-step 122, the template type is further stabilized to avoid too many template changes. To this aim, template shots are defined. A template shot is initialized with first n successive pictures. n is larger than p, e.g. n=10 if p=5. The most occurring template type in this template shot is Z, where Z $\in$ {i,I,L,T,V,X,Y,J,O}. A next picture is considered to belong to this template shot if its template type is Z or if there is a picture of template type Z in the (n−1) following pictures. If not, then the current template shot is finished and a new template shot is initialized.

When the template shots are defined for the whole video or each time a new template shot is defined, the template type of all the pictures in each template shot is set to the template type Z of the template shot.

For the pictures whose template type is changed either after step 120 or 122, the angle is also modified. More precisely, the angle is computed as the angle for which the Kullback-Leibler divergence is the lowest for the template of type Z. According to a variant, the Kullback-Leibler divergences computed at step 10 are stored and reused at sub-step 122. At the end of sub-step 122, all pictures of a template shot have a same template type.

At a sub-step 124, the angles are filtered using a median filter with the same temporal window as the one used at sub-step 120 or with a different one. The angles are defined in degree modulo 360. This is taken into account during the median filtering. In fact, the value modulo 360 that is the closest to the mean value of the other values in the temporal window is taken into account. As an example for a temporal window of size 3 where the angles are 53, 54 and 396, the value 396 is changed to the value 36 for the median filtering. As another example, for a temporal window of size 3 where the angles are 53, 54 and 342, the value 342 is changed to the value −18 for the median filtering. According to a specific characteristic, the temporal window is a sliding window.

In an optional sub-step 126, the angles are further stabilized to avoid too many changes. To this aim, harmony shots are defined. An harmony shot is initialized with first q successive pictures having a common template type Z. $\alpha_{median}$ is the median angle of these first q successive pictures. q is lower or equal to n if step 122 is executed or q is lower or equal to p if only step 120 is executed. A next picture is considered to belong to this harmony shot if its template type is Z and if its angle $\alpha_i$ is close to $\alpha_{median}$, e.g. $|\alpha_{median}-\alpha_i|<Th$, where Th is a threshold value, e.g. Th=30 or if there is a picture of template type Z in the (q−1) following pictures whose angle is close to $\alpha_{median}$. If not, then the current harmony shot is finished and a new harmony shot is initialized. Advantageously, sub-step 126 is executed when 122 is executed and vice versa.

When the harmony shots are defined for the whole video or each time a new harmony shot is defined, the angle of all the pictures in each harmony shot is set to the value of $\alpha_{median}$.

Advantageously having a stable template type and angle limit the temporal artifacts after picture harmonization.

Figure 6:
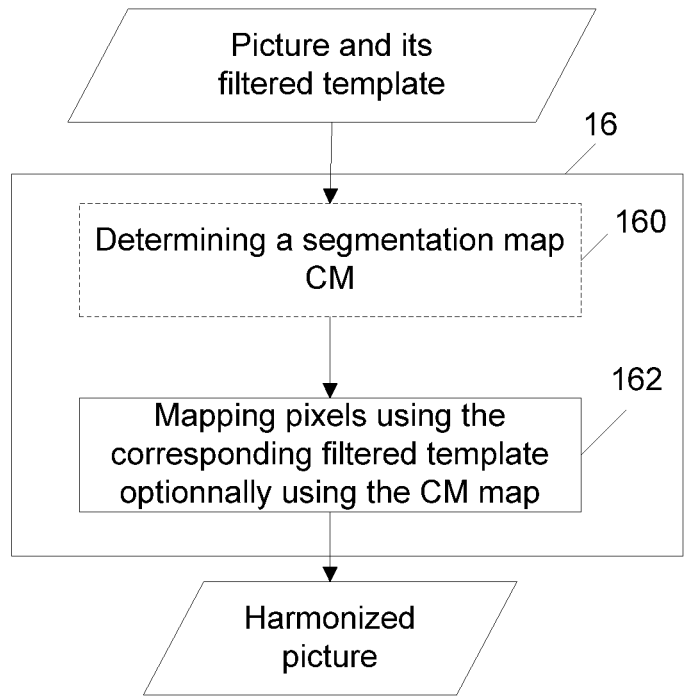
FIG. 6 depicts a detailed implementation of the processing step according to the invention.

In an optional step 14, scene cuts are detected for the video and harmony changes are possibly moved onto the scene cut by propagating template type and angles of neighboring pictures. More precisely, when the temporal distance between a template's change (angle, type or both) and a scene cut is below a threshold value (e.g. 1 second), the template (type, angle or both) is modified for at least one picture between the scene cut and the template change so that the template's change is temporally aligned on the scene cut. In a step 16, each picture of the video is processed according to its filtered template. The step 16 is detailed with respect to FIG. 6 for one picture and is iterated for each picture of the video.

In a sub-step 162, the pixels of each picture are mapped onto the corresponding filtered template. More precisely, the outliers (in the sense that they are outside the selected template) are mapped into the harmonious sector(s) or close to by applying hue mapping functions. In fact, the mapping function is applied to all pixels regardless of their initial hue value.

Figure 7:
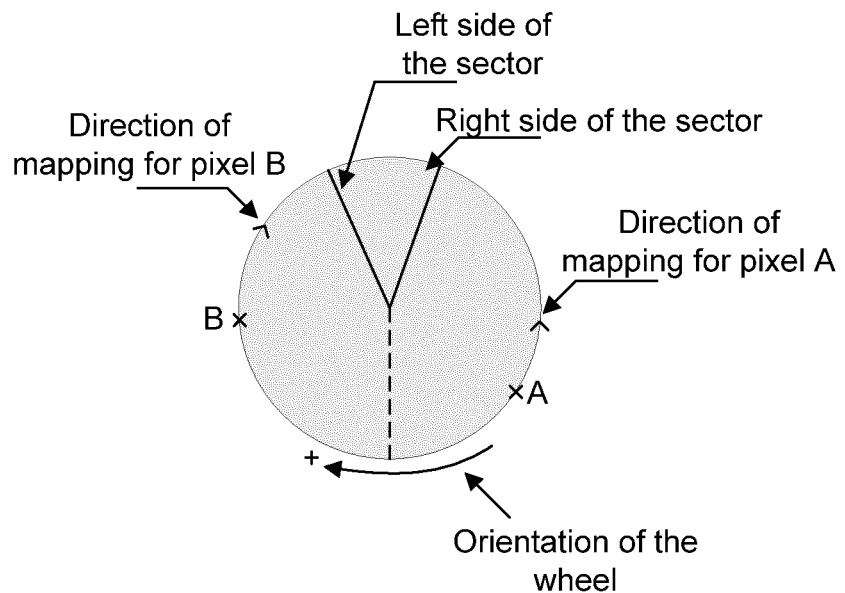
FIG. 7 represents a template and illustrates the principle of direction of mapping.

A sigmoid function is thus used to map the hue of each pixel p:

$$H'(p) = C(p) + \text{Sgn} * \frac{w}{2} * \tanh\left(\frac{2 * \|H(p) - C(p)\|}{w}\right)$$

where C(p) is the central hue of the sector associated with p, w is the arc-width of the template sector and $\|\ \|$ refers to the arc-length distance on the hue wheel and Sgn is the sign associated with the direction of mapping. A pixel is for example mapped on a sector side that is the closest. As depicted on FIG. 7, the pixel A is for example mapped on the right side of the sector since it is the closest side while pixel B is mapped on the left side of the sector. The hue wheel being oriented, Sgn is positive when the direction of mapping and the orientation of the wheel are in opposite direction (case of pixel A) while the Sgn is negative (case of pixel B) otherwise. According to the invention, the direction of mapping for a given pixel is not necessarily determined so that the pixel is mapped in the closest side of the sector. This sigmoid function has good attributes for pixel mapping. Its asymptote in extreme value auto-clamp pixels in the template and its middle section (normal behavior) is nearly linear so at the center of a sector, hues are not changed. The proposed mapping function guarantees original hue values at the center of the harmonious sectors and compresses more strongly hue values outside the template. The harmonic colors are preserved, and only non-harmonic hues are modified.

Directly applying the above sigmoid function at harmony change (i.e. change from a template T1 to a template T2, where T1 and T2 differs either by their type, angle or both) may result in visible color change. The harmony change is also called template change. This is not an issue if the harmony change (i.e. change of either the harmonious color template type or angle or both) coincides with a scene cut. Indeed, at scene cut almost all the colors in the picture change so using a different harmonious color template before and after the scene cut is hardly visible. On the contrary, when harmony change does not coincide with a scene cut, using a different harmonious color template without caution may result in annoying color change. Consequently, according to a variant the mapping is smoothed so that viewers do not see abrupt change of color template. To this aim, a transition window of N pictures in length is centered on the template change. Then, the pixel mapping is done by applying both templates T1 and T2 during this transition window with appropriate weights depending on the time position t in the transition window of the current picture whose pixels are to be mapped (with t=1 for the first picture of the N-pictures window, and t=N for the last picture of the window). The sigmoid function is thus modified as follows:

$$H'(p) = \left[C_1(p) + Sgn1 * \frac{w_1}{2} * \tanh\left(\frac{2*\|H(p) - C_1(p)\|}{w_1}\right)\right] * \frac{N-t}{N} + \left[C_2(p) + Sgn2 * \frac{w_2}{2} * \tanh\left(\frac{2*\|H(p) - C_2(p)\|}{w_2}\right)\right] * \frac{t}{N}$$

where C1(p) is the central hue of the sector associated with p for the template T1, w1 is the arc-width of the template sector of T1 and C2(p) is the central hue of the sector associated with p for the template T2, w2 is the arc-width of the template sector of T2 and ‖ ‖ refers to the arc-length distance on the hue wheel. Sgn1 is the sign associated with the direction of mapping in the template T1 and Sgn2 is the sign associated with the direction of mapping in the template T2.

The sub-step 162 can produce visible artifacts because two neighboring pixels that have similar colors can be mapped in opposite directions and consequently in opposite sides of a same sector or in different sectors. To remove these artifacts, a segmentation map of the original picture is determined in an optional sub-step 160, for each picture of the video, to ensure that all pixels in the same segmented area of the segmentation map are mapped with the same direction of mapping and in the same sector. This direction of mapping is for example the one mostly assigned to these pixels in a given segmented area. This direction of mapping is stored for example in a direction of mapping map that associates with each pixel the direction of mapping of its segmented area.

The segmentation map defines different regions in the original image, wherein pixels of a given region have close colors. Any method providing such a map can be used. An example of such algorithm is disclosed in the paper from Van de Weijer et al entitled "*learning color names for real world applications*" published in IEEE Transactions in Image processing in 2009. For color harmonization, the spatial aspect of the color segmentation is not compulsory. Therefore, a histogram segmentation technique is adequate here, such as the popular K-means method. However, such histogram segmentation should respect the following constraints:

It should be unsupervised, meaning that the final number of color clusters should not be a parameter. As a matter of fact, the color harmonization would be very sensitive to an incorrect number of meaningful colors.

The histogram segmentation technique should be capable of segmenting small modes of the histogram. In other words, small regions that could be seen as color outliers should be detected as separate modes.

In order to meet these requirements, a color segmentation method is disclosed that build on the work of Delon et al. referred to as ACoPa (Automatic Color Palette) and disclosed in the paper entitled "*A nonparametric approach for histogram segmentation*" published in IEEE Transactions on Image Processing, 16(1):253-261, 2007. This color segmentation technique is based on a contrario analysis of the color histogram modes. A statistical estimation of meaningful histogram modes is performed. Instead of the hierarchical estimation of modes in the H, then S, then V space, a histogram decomposition of each component is performed independently. The obtained modes are combined from all modes obtained, and segments with a very limited group of pixels are discarded. Finally, based on these histograms modes, a K-means post-processing is used to group the modes that are perceptually similar using a dictionary expressed in the Lab color space.

This segmentation technique is approximately 10 times faster than the original version. Besides, it deals more efficiently with achromatic pixels. Using a non-spatial algorithm allows to treat all pixels having the same colors without a priori on their positions.

However, determining the direction of mapping map of step 160 independently for picture of the video can create flickering. To avoid this, the direction of mapping map is propagated from one picture to the next using motion estimation in a variant embodiment. A motion vector $v_p$ is computed for each pixel in a current picture that points in a preceding picture (backward motion field). A motion vector reliability value is further computed for each vector. For example, a forward motion field is also computed between the preceding picture and the current picture, i.e. a motion vector is computed for each pixel in the preceding picture that points to the current picture. The motion vector reliability value is computed as the distance between a backward motion vector Vback and a forward motion vector Vforw, i.e. the forward motion vector of the pixel in the preceding picture to which the backward motion vector points. The motion vector reliability value is computed as follows:

$$r_p = \begin{cases} \frac{D - \text{diff}}{D} & \text{if diff} \leq D \\ 0 & \text{otherwise} \end{cases}, \text{e.g. } D = 2.$$

diff is the Euclidean distance between Vback and Vforw.

If $rp > r_{threshold}$, the direction of mapping map value of the corresponding pixel in the preceding picture is kept for the current pixel. $r_{threshold}$ is for example equal to 0.5. Otherwise, if $rp \leq r_{threshold}$ and if the pixel is in a segment containing many pixels (e.g. at least 50% of the pixels of the segment) with a propagated value, then assign the most occurring direction (among the propagated values) to these pixels. According to a variant, the most occurring direction (among the propagated values) is assigned to all the pixels in the segment. If $rp \leq r_{threshold}$ and if the pixel is in a segment containing no pixel or very few pixels with a propagated value, then compute the value for the pixels of this segment as the most occurring direction of mapping as done classically.

Figure 8:
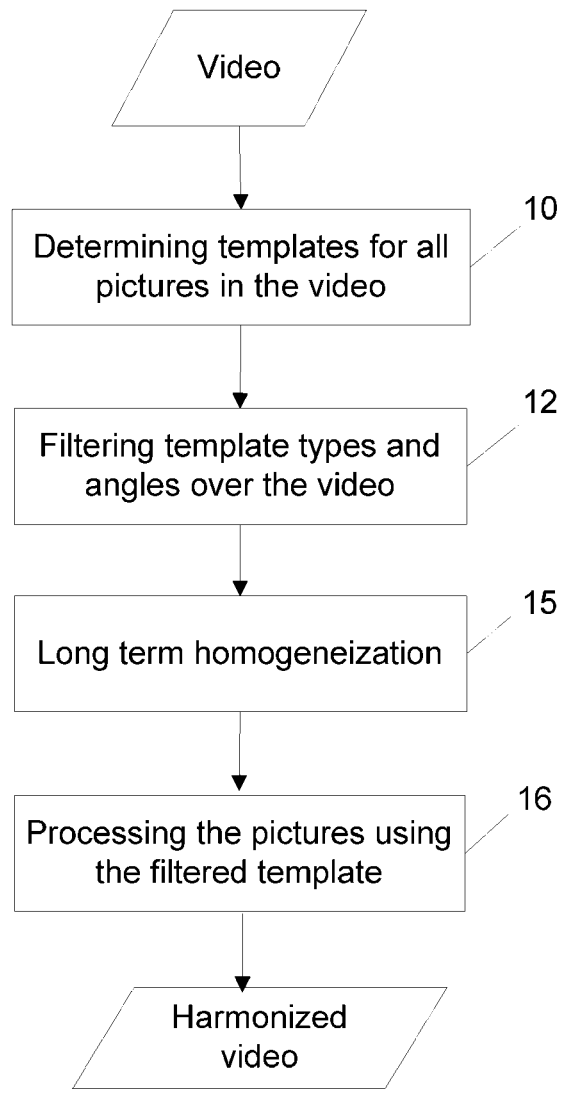
FIG. 8 depicts a flowchart of the image processing method according another particular embodiment.
Figure 9:
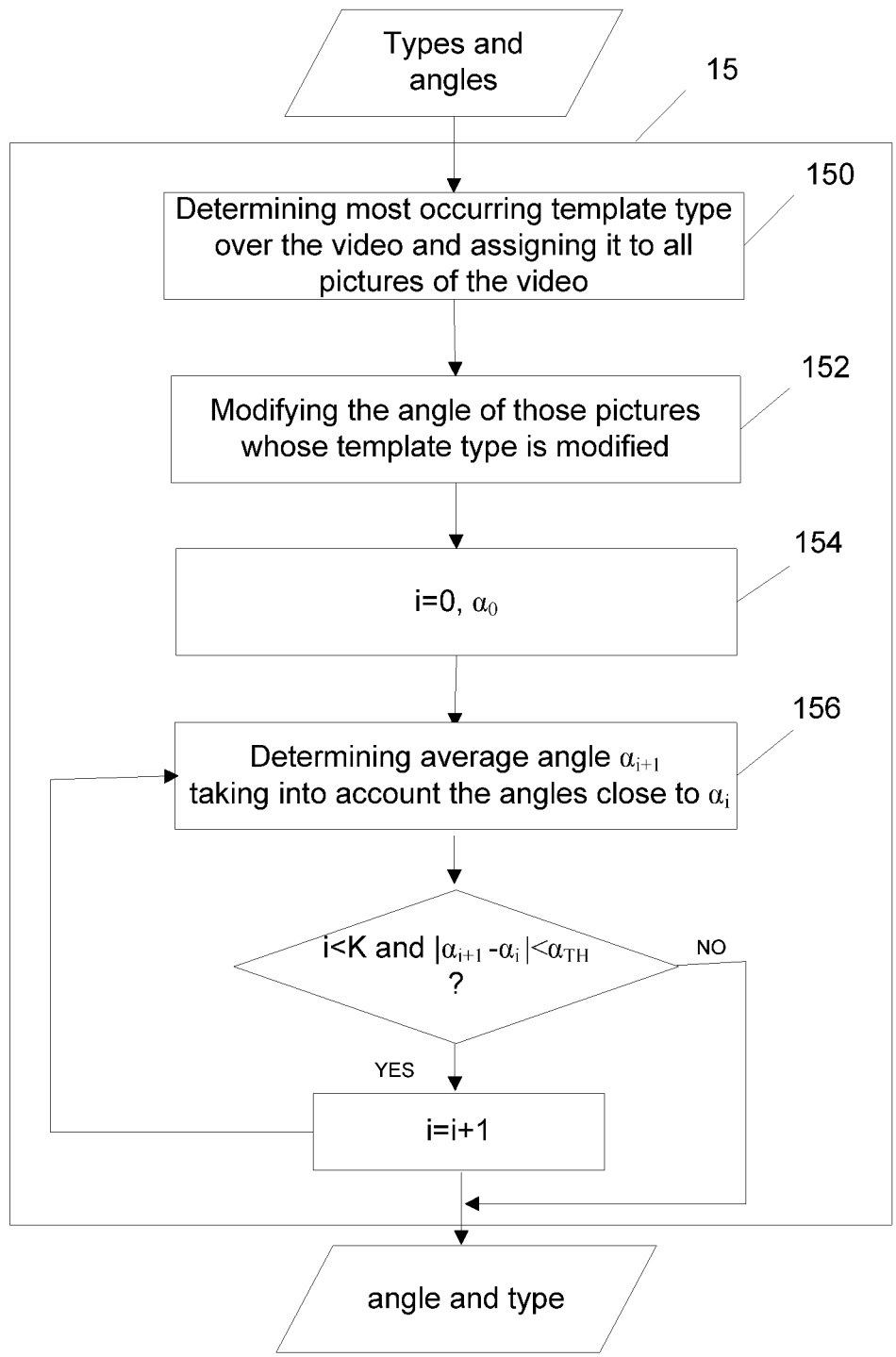
FIG. 9 depicts a detailed implementation of the long term harmonization step.

According to another embodiment of the invention depicted on FIG. 8, a single template (type and angle) is determined for the whole sequence after step 12. Following the step 12, a step 15 of long term harmonization is applied. During this step a single template type and single angle is determined for the whole video. This single template thus defined is used during the processing step 16. The step 15 is further detailed with respect to FIG. 9. In a step 150, a template type for the sequence is for example determined as the most occurring template type Z. The template type of all pictures in the video is set to Z.

In a step 152, the angle of the pictures for which the template type changes is modified to the angle that gives the lowest Kullback-Leibler divergence for that template type Z.

In a step 154, an initial average angle $\alpha_0$ is determined as the mean value of the angles $\theta_k$ of all pictures. An index i is set equal to 0.

In a step 156, a new average angle $\alpha_{i+1}$ is determined by averaging only those angles $\theta_k$ whose value is close to the value $\alpha_i$, i.e. $|\theta_k-\alpha_i|<da$, with da is a threshold value, e.g. $d\alpha=30$.

The process is iterated until $\alpha$ is stable ($|\alpha_{i-1}-\alpha_i|<\alpha_{TH}$, $\alpha_{TH}=1°$, and while i<K, e.g. K=10.

This ensures limited harmonization variations and stable harmonized colors.

Figure 10:
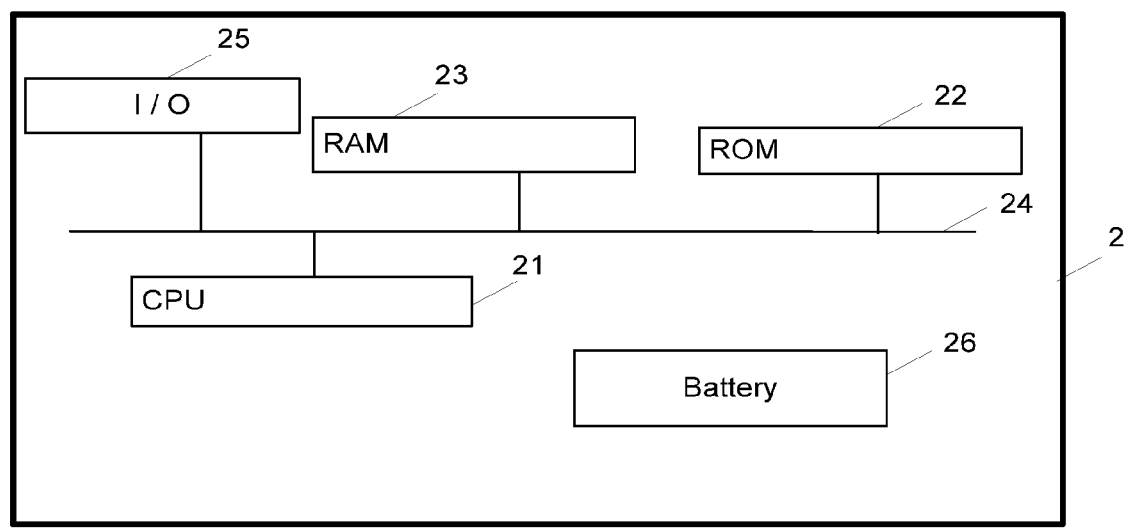
FIG. 10 represents an exemplary architecture of a processing device according to the invention.

FIG. 10 represents an exemplary architecture of a processing device 2 according to a specific and non-limiting embodiment. The processing device 2 can be for example a tablet, a PDA or a cell phone. Processing device 2 comprises following elements that are linked together by a data and address bus 24:
- at least one processor 21 (CPU and/or GPU), which is, for example, a DSP (or Digital Signal Processor);
- one or several memory(ies) such as RAM (or Random Access Memory) 23 and possibly ROM (or Read Only Memory) 22;
- one or several Input/Output interface(s) 25, for example a keyboard, a mouse; and
- a battery 26.

Each of these elements of FIG. 10 are well known by those skilled in the art and won't be disclosed further. The processing device 2 may comprise display means such as a screen for displaying the processed pictures. In each of mentioned memory, the word <<register>> used in the specification can correspond to area of small capacity (some bits) or to very large area (e.g. a whole program or large amount of received or decoded data). RAM 23 comprises in a register, the program executed by the processor 21 and uploaded after switch on of the processing device 2, input data in a register, processed data in different state of the processing method in a register, and other variables used for processing in a register.

When switched on, the processor 21 uploads the program in the RAM and executes the corresponding instructions. The pictures to be processed are received on one of the Input/Output interfaces 25. One of the Input/Output interface 25 is adapted to transmit the pictures processed according to the invention.

According to variants, processing devices 2 compatible with the invention are implemented according to a purely hardware realisation, for example in the form of a dedicated component (for example in an ASIC (Application Specific Integrated Circuit) or FPGA (Field-Programmable Gate Array) or VLSI (Very Large Scale Integration) or of several electronic components integrated into a device or even in a form of a mix of hardware elements and software elements.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for processing a video comprising obtaining a template type and an angle of an harmonious template for at least one picture of said video independently, said harmonious template defining on a hue wheel at least one sector of harmonious hue values and said angle defining a rotation of said at least one sector around the hue wheel, the method being characterized in that it further comprises:
   a) associating with said picture of the video a filtered template type, the filtered template type being the template type with a highest occurrence in a first temporal window comprising at least said picture;
   b) determining a new angle for the pictures of the video whose template type is changed in response to the associating;
   c) associating with said picture of the video a filtered angle obtained by applying a median filter over the angles in a second temporal window comprising at least said picture;
   d) processing said picture of the video, wherein processing the picture comprises mapping colors of the picture into a template associated with said picture and defined by said filtered template type and said filtered angle.

2. The method of claim 1, further comprises after step b):
   b1) initializing one template shot with n successive pictures, wherein n is a positive whole number;
   b2) adding a next picture in said one template shot if its template type is the highest occurring template type of said template shot or if there is a picture whose template type is the highest occurring template type of said template shot in the n−1 pictures following said next picture and otherwise iterating steps b1) and b2) with a next template shot until template shots are defined for the whole video;
   b3) associating with all pictures in said template shot the highest occurring template type of said template shot.

3. The method of claim 1, further comprises after step c):
   c1) initializing one harmony shot with q successive pictures having a common template type, wherein q is a positive whole number;
   c2) adding a next picture in said one harmony shot if its angle is close to the median angle of the q successive pictures or if there is a picture whose angle is close to the median angle of the q successive pictures in the q−1 pictures following said next picture and otherwise iterating steps c1) and c2) with a next harmony shot until harmony shots are defined for the whole video;
   c3) associating with all pictures in said harmony shot the median angle of said harmony shot.

4. The method of claim 1, further comprising, when a temporal distance between a template type and/or angle change and a scene cut is below a threshold value, modifying, after temporal filtering, the template type and/or angle of at least one picture between the scene cut and the template type and/or angle change so that the template type and/or angle change is temporally aligned on the scene cut.

5. The method of claim 1, wherein, when a template change between a first template and a second template is not temporally aligned on a scene cut, mapping the colors of a picture around the template change comprises applying a mapping function defined from both the first and the second templates.

6. The method of claim 5, wherein a transition window being centered on the template change between the first template and the second template, mapping the colors of a picture in the transition window comprises applying a mapping function defined as a weighted sum of a first mapping function defined from said first template and of a second mapping function defined from said second template, the first and the second mapping functions being weighted depending on a time position of said picture within the transition window.

7. The method according to claim 1, wherein processing said picture of the video further comprises determining a direction of mapping for at least one pixel of a picture and mapping the colors of said pixel in said direction of mapping into the template associated with said picture.

8. The method according to claim 7, wherein processing said picture of the video further comprises segmenting the picture into regions of similar colors and wherein colors of pixels in the same segmented regions are mapped into one and a same direction of mapping.

9. The method according to claim 8, wherein determining a direction of mapping for at least one pixel of a picture comprises, for a current picture, determining a backward motion vector for at least one pixel in the current picture pointing to a pixel in a preceding picture and for at least one pixel in the preceding picture a forward motion vector pointing to a pixel in the current picture, determining for at least one pixel in the current picture a motion vector reliability value depending on a distance between the backward motion vector associated with said pixel and the forward motion vector associated to the pixel to which said backward motion vector points and propagating the directions of mapping from the preceding picture to the current picture for the pixel whose motion vector reliability value is above a threshold value.

10. A device for processing a video comprising at least one processor configured to obtain a template type and an angle of an harmonious template for at least one picture of said video independently, said harmonious template defining on a hue wheel at least one sector of harmonious hue values and said angle defining a rotation of said at least one sector around the hue wheel, wherein the at least one processor is further configured to:
   a) associate with said picture of the video a filtered template type, the filtered template type being the template type with a highest occurrence in a first temporal window comprising at least said picture;
   b) determine a new angle for the pictures of the video whose template type is changed in response to the associating;
   c) associate with said picture of the video a filtered angle obtained by applying a median filter over the angles in a second temporal window comprising at least said picture;
   d) process said picture of the video, wherein processing the picture comprises mapping colors of the picture into a template associated with said picture and defined by said filtered template type and said filtered angle.

11. A non-transitory computer-readable storage medium storing program instructions computer-executable to perform the method of claim 1.

12. The device of claim 10, wherein the at least one processor is further configured to after step b):
   b1) initialize one template shot with n successive pictures, wherein n is a positive whole number;
   b2) add a next picture in said one template shot if its template type is the highest occurring template type of said template shot or if there is a picture whose template type is the highest occurring template type of said template shot in the n−1 pictures following said next picture and otherwise iterating steps b1) and b2) with a next template shot until template shots are defined for the whole video;

b3) associate with all pictures in said template shot the highest occurring template type of said template shot.

13. The device of claim 10, wherein the at least one processor is further configured to after step c):

c1) initialize one harmony shot with q successive pictures having a common template type, wherein q is a positive whole number;

c2) add a next picture in said one harmony shot if its angle is close to the median angle of the q successive pictures or if there is a picture whose angle is close to the median angle of the q successive pictures in the q−1 pictures following said next picture and otherwise iterating steps c1) and c2) with a next harmony shot until harmony shots are defined for the whole video;

c3) associate with all pictures in said harmony shot the median angle of said harmony shot.

14. The device of claim 10, wherein the at least one processor is further configured to, when a temporal distance between a template type and/or angle change and a scene cut is below a threshold value, modify, after temporal filtering, the template type and/or angle of at least one picture between the scene cut and the template type and/or angle change so that the template type and/or angle change is temporally aligned on the scene cut.

15. The device of claim 10, wherein the at least one processor is further configured to, when a template change between a first template and a second template is not temporally aligned on a scene cut, map the colors of a picture around the template change comprises applying a mapping function defined from both the first and the second templates.

* * * * *